United States Patent
Hohmann et al.

(10) Patent No.: US 11,312,104 B2
(45) Date of Patent: Apr. 26, 2022

(54) MAKING AND USING AN ADHESIVE TAPE FOR WRAPPING AN ELONGATED OBJECT

(71) Applicant: CERTOPLAST TECHNISCHE KLEBEBÄNDER GMBH, Wuppertal (DE)

(72) Inventors: Andreas Hohmann, Wuppertal (DE); Timo Leermann, Wuppertal (DE); Peter Rambusch, Wuppertal (DE); Rene Rambusch, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 11 days.

(21) Appl. No.: 16/647,040

(22) PCT Filed: Aug. 22, 2018

(86) PCT No.: PCT/EP2018/072656
§ 371 (c)(1),
(2) Date: Mar. 13, 2020

(87) PCT Pub. No.: WO2019/101378
PCT Pub. Date: May 31, 2019

(65) Prior Publication Data
US 2020/0276790 A1 Sep. 3, 2020

(30) Foreign Application Priority Data
Nov. 24, 2017 (DE) .......................... 102017127893.1

(51) Int. Cl.
*B32B 7/14* (2006.01)
*C09J 7/20* (2018.01)
(Continued)

(52) U.S. Cl.
CPC ................ *B32B 7/14* (2013.01); *B29C 53/02* (2013.01); *B29C 63/14* (2013.01); *B32B 3/08* (2013.01);
(Continued)

(58) Field of Classification Search
CPC ......... B29C 53/02; B29C 63/14; B29C 65/48; B29C 65/4825; B29C 65/4815;
(Continued)

(56) References Cited

U.S. PATENT DOCUMENTS 4,625,909 A * 12/1986 Ferrando ................ B42D 5/025
229/92.1
5,050,909 A * 9/1991 Mertens ..................... B41L 1/24
283/81
(Continued)

*Primary Examiner* — Philip C Tucker
*Assistant Examiner* — Brian R Slawski
(74) *Attorney, Agent, or Firm* — Andrew Wilford

(57) ABSTRACT

A sheath for an elongated object is made by first combining an adhesive tape comprised of a substrate strip and a first adhesive coating at least partially covering the substrate strip with an adhesive-free band to form a laminate. Then the substrate strip and the band are overlapped at least largely such that, at the overlap, the first adhesive coating is between the substrate strip and the band. Finally the first adhesive coating is formed at the overlap between the substrate strip and the band of a plurality of spaced adhesive substrips.

8 Claims, 1 Drawing Sheet

(51) Int. Cl.
*B32B 3/08* (2006.01)
*B32B 5/02* (2006.01)
*B32B 27/12* (2006.01)
*B29C 53/02* (2006.01)
*B29C 63/14* (2006.01)
*H02G 3/04* (2006.01)
*B29C 65/50* (2006.01)
*B29C 65/00* (2006.01)
*B29C 65/48* (2006.01)

(52) U.S. Cl.
CPC ............... *B32B 5/02* (2013.01); *B32B 27/12* (2013.01); *C09J 7/20* (2018.01); *B29C 65/481* (2013.01); *B29C 65/5021* (2013.01); *B29C 66/232* (2013.01); *B32B 2262/0276* (2013.01); *B32B 2405/00* (2013.01); *B32B 2457/00* (2013.01); *C09J 2203/302* (2013.01); *C09J 2301/124* (2020.08); *C09J 2301/204* (2020.08); *C09J 2400/263* (2013.01); *H02G 3/0462* (2013.01)

(58) Field of Classification Search
CPC . B29C 65/50; B29C 65/5007; B29C 65/5021; B29C 65/481; B29C 66/232; B32B 2255/02; B32B 2255/26; B32B 2262/0276; B32B 2405/00; B32B 2457/00; B32B 27/12; B32B 3/08; B32B 5/02; B32B 7/12; B32B 7/14; C09J 2203/302; C09J 2301/124; C09J 2301/204; C09J 2301/1242; C09J 2400/263; C09J 7/20; C09J 7/30; C09J 7/29; H01B 13/012; H01B 7/0045; H02G 3/0462
USPC ......... 156/60, 166, 182, 196, 212, 213, 215, 156/221, 222, 290, 291, 292; 428/98, 428/189, 195.1, 198, 201, 377; 174/173
See application file for complete search history.

(56) References Cited

U.S. PATENT DOCUMENTS

| | | | | |
|---|---|---|---|---|
| 5,323,981 | A * | 6/1994 | Dionne | B65H 19/102 156/502 |
| 5,411,168 | A * | 5/1995 | Mertens | B42D 5/005 206/233 |
| 5,622,761 | A * | 4/1997 | Cole | C09J 7/38 428/41.9 |
| 7,132,028 | B1 | 11/2006 | Wahlers-Schmidlin | |
| 7,735,872 | B1 * | 6/2010 | Arkwright | B42F 11/00 281/45 |
| 10,000,669 | B2 | 6/2018 | Leermann | |
| 10,395,803 | B2 | 8/2019 | Hohmann | |
| 2010/0122835 | A1 * | 5/2010 | Doi | C09J 7/29 174/135 |
| 2013/0273333 | A1 | 10/2013 | Meier | |
| 2017/0248267 | A1 * | 8/2017 | Shuey | B32B 3/266 |

* cited by examiner

MAKING AND USING AN ADHESIVE TAPE FOR WRAPPING AN ELONGATED OBJECT

CROSS REFERENCE TO RELATED APPLICATIONS

This application is the US-national stage of PCT application PCT/EP2018/072656 filed 22 Aug. 2018 and claiming the priority of German patent application 102017127893.1 itself filed 24 Nov. 2017.

FIELD OF THE INVENTION

The invention relates to a method of making a sheath, and in particular a longitudinal sheath for an elongated object, in particular a method of making a longitudinal sheath or wrap for cable sets.

BACKGROUND OF THE INVENTION

Typically, an adhesive tape is made of a substrate strip and a first adhesive coating that at least partially covers the substrate strip and is combined with an adhesive-free band to form a laminate. The substrate strip and the band at least largely overlap, and at the overlap the first adhesive coating is between the substrate strip and the band.

The manufacture of sheaths, and in particular longitudinal sheaths for an elongated object, such as for example cable sets in automobiles, has the basic advantage that in this manner, the cables and lines are protected, for example, from chafing loads. Such a sheath may wrap not only electric cables, but also hoses and tubes and even pin-and-socket connections, and sometimes terminal devices, may be supported and held together by the wrap. Altogether, only a minimum amount of space is required for this. For this reason, such sheaths, and in particular longitudinal sheaths, are increasingly employed in making in particular of cable harnesses in automobiles.

Here, very different procedures are followed in the making such sheaths or longitudinal sheaths, respectively. For example, the procedure of EP 1 875 573 [U.S. Pat. No. 7,132,028] is to make the casing of two adhesive tapes, a third adhesive tape being applied onto the casing. The expenditure in manufacturing involved is essential insofar as three adhesive tapes have to be stored and supplied for the manufacture of the sheath and aligned with respect to each other in precise positions.

In a generic method corresponding to WO 2016/045890 [U.S. Pat. No. 10,395,803] of applicant, the procedure is to combine an adhesive tape of a substrate and a first adhesive coating that essentially covers all the front face of the substrate strip with the adhesive-free band to form a laminate. Moreover, the substrate strip of the adhesive tape is also equipped with a further, second adhesive coating at its rear essentially over a part of its surface.

In this manner already, an easy-to-realize and inexpensive possibility is created of wrapping cable sets with the described sheath, and of providing significant protection against mechanical damages, for example due to chafing and rubbing at sharp edges, burrs and welding points. Manufacture is facilitated by relying only on the adhesive tape and the adhesive-free band. At this point, further improvements are possible in that the subsequent attachment of the sheath to the elongated object is facilitated. This is where the invention comes into play.

OBJECT OF THE INVENTION

The object of the invention is to further develop a method of making the embodiment described above in such a way that in particular the attachment to the elongated object is further facilitated while the design is altogether cost-optimized.

SUMMARY OF THE INVENTION

To attain this object, in a generic method of making a sheath, and in particular a longitudinal sheath for an elongated object, the first adhesive coating in the interstice between the region of overlap between the substrate strip and the band is composed of a plurality of spaced adhesive substrips.

That is, within the scope of the invention, the substrate strip as part of the adhesive tape and the adhesive-free band first of all define a region of overlap. This region of overlap is determined by the substrate strip and the band at least largely overlapping, which means they are arranged with respect to each other while defining the region of overlap in such a way that the substrate strip extending in the longitudinal direction and the band extending in the longitudinal direction are arranged, in the cross-section, over more than half of their respective widths and consequently define and describe the region of overlap with the first adhesive coating provided at the overlap. Normally, the substrate strip and the band do not only overlap at least largely, but completely. That means that the substrate strip and the band are laminated one onto the other in a common longitudinal extension and have a common width so that the longitudinal edges of the substrate strip and the band are one on the other.

However, it is basically also possible for the substrate strip, or else the band, to project laterally from the region of overlap. Normally, however, the invention does without such a projection, although it is possible.

The invention rather takes advantage of the fact that the formed laminate and the region of overlap between the substrate strip and the band define, together with the inserted first adhesive coating, altogether a band material which has an increased abrasion protection by relying on the multilayer design and the inserted first adhesive coating.

Indeed, the band material realized in this way includes an abrasion protection which normally exceeds 1½ of the abrasion protection of the substrate strip or the band alone. In most cases, even values are observed which correspond to the sum of the abrasion protection or are even higher. The adhesive coating in this context takes care that any mechanical loads or else chafing loads are diverted from the substrate strip to the band or vice versa.

In any case, the laminate made in this manner is superior to former embodiments in this context. In addition, according to the invention, the first adhesive coating at the overlap between the substrate strip and the band is composed of a plurality of spaced adhesive substrips. This saves material for the realized first adhesive coating compared to an all-over coating. Here, it turned out according to the invention that the adhesive substrips realized and spaced apart at this point cannot be distinguished, as regards their positive effect of increasing the abrasion protection, from the measure of realizing the first adhesive coating all-over in the interstice.

That means, in particular the abrasion protection of the band material defined and made in this manner reaches values that correspond to those observed in a case where the first adhesive coating connects the substrate strip and the band to each other all over at the interstice.

All this is achieved according to the invention simultaneously at reduced costs as it turned out that even adhesive tapes spaced apart as first adhesive coating provide the practically equal positive effect of an increased abrasion resistance.

In addition, there is a further advantage in that the longitudinal sheath or wrap according to the invention may be particularly easily attached in the longitudinal direction around the elongated object. To this end, the longitudinal sheath or wrap is in most cases folded around the elongated object in the longitudinal direction, wherein the individual spaced adhesive substrips of the first adhesive coating in this context facilitate the enveloping process and thus the attachment to the elongated object.

Basically, this is due to the fact that the laminate forms individual "hinges" in the cross-section at the overlap between the substrate strip and the band due to the quasi strip-like connection by the realized adhesive tapes, the hinges facilitating the longitudinal enveloping or the longitudinal folding of the longitudinal sheath or wrap attached to the elongated object in this manner. These are the essential advantages.

According to an advantageous embodiment, the adhesive substrips of the first adhesive coating are of identical widths. Moreover, in most cases, the adhesive substrips of the first adhesive coating are applied to the substrate strip equidistantly, which means at equal spacings from each other. In this manner, one may work, for example, with a fixed nozzle arrangement for the application of the adhesive substrips of the first adhesive coating. This is because the adhesive substrip is advantageously an adhesive substrip that is applied by a nozzle by melt application of a for example UV-curable acrylate hot-melt adhesive onto the substrate strip. Of course, other methods to be able to define the respective adhesive substrips of the first adhesive coating on the substrate strip are also conceivable.

The fact that, in addition, a further, second adhesive coating is applied onto the band onto its outer face turned away from the adhesive tape is of particular importance. The second adhesive coating, too, is advantageously designed as at least one adhesive substrip, so that to make both the first and the second adhesive coatings, one nozzle arrangement each may be employed, and advantageously, one hot-melt adhesive each also suffices for making the desired adhesive coating. As in the case of the first adhesive coating, this may be a UV-curable acrylate adhesive that is, of course, also only an example and is not compulsory.

Since the second adhesive coating is advantageously also embodied as at least one adhesive substrip, it has furthermore proved to be particularly advantageous for the second adhesive coating to be composed of substrips each attached to the adhesive substrip at a respective one of the longitudinal edges. In this manner, the band is equipped, on its outer face turned away from the adhesive tape, with adhesive substrips at its two longitudinal edges. This way, the sheath made in this manner may be initially fixed with the one adhesive substrip at one longitudinal edge on the elongated object. Subsequently, the sheath is folded around the elongated object so that the other adhesive substrip on the opposite longitudinal edge will then close the sheath. To this end, the adhesive substrips are each normally adhered to the outer face of the substrate strip of the adhesive tape. Actually, the outer face of the substrate strip of the adhesive tape is typically free of an adhesive coating so that the described longitudinal casing is achieved.

It has proven useful for the two adhesive substrips of the second adhesive coating to be applied onto the band with equal widths. To this end, one can again employ a nozzle arrangement of a simple design that applies the hot-melt adhesive to the band. The further measure of the invention can be also seen in this context according to which all adhesive substrips have a width within a range of 5 to 30% of the width of the region of overlap. That means the width of the adhesive substrip, which extends along and follows the longitudinal extension of the substrate strip or the band, is measured compared to the width of the region of overlap with the given values within a range of 5% to 30%. Here, widths for all adhesive substrips within a range of 10% to 25%, based on the width of the region of overlap, are observed to be particularly preferred. Thereby, in practice, identically designed nozzles may each take care of the application of a respective adhesive substrip, and these nozzles may be, for example, attached and retained in a common mount as required at a desired spacing from to each other.

The subject matter of the invention also is a sheath, and in particular a longitudinal sheath, for an elongated object, in particular a longitudinal sheath or wrap for cable sets. The longitudinal sheath or wrap of interest may be advantageously made by the manufacturing process described above.

BRIEF DESCRIPTION OF THE DRAWING

Below, the invention will be illustrated more in detail with reference to a drawing only representing one embodiment; wherein.

SPECIFIC DESCRIPTION OF THE INVENTION

Figure 2:
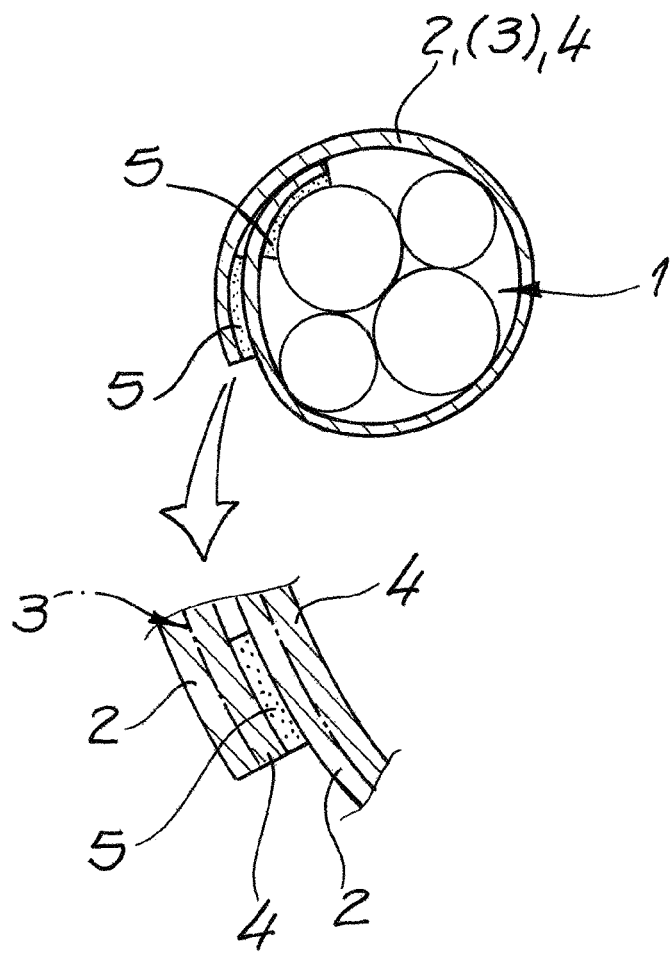
FIG. 2 is a schematic section through the sheath as a wrap for an elongated object.

In the drawing, first of all, a longitudinal sheath or wrap is shown. The longitudinal sheath encases or wraps an elongated object 1 as shown in FIG. 2. The elongated object 1 is, by way of example and not restrictively, several cables or tubes or lines in a motor vehicle.

The sheath for the elongated object 1 is a longitudinal casing for a cable set here serving to wrap the cable set and in this manner produce a cable harness or otherwise provide protection and hold together the cable set.

To make the longitudinal sheath or wrap, first of all, an adhesive tape 2, 3 is provided. The adhesive tape 2, 3 has a substrate strip 2 and a first adhesive coating 3 at least partially covering the substrate strip 2. Here, the substrate strip 2 is nonrestrictively a textile, for example a polyester that has or may have for example a grammage of 50 g/m$^2$ to 500 g/m$^2$, and in particular up to 300 g/m$^2$.

Basically, instead of a textile substrate or polyester textile substrate, a different substrate, such as a film, may be employed as the substrate strip 2.

Normally, however, the substrate strip 2 is a textile substrate strip. In the described and illustrated example, the textile substrate strip 2 is a textile and in particular polyester. Basically, however, the textile substrate strip 2 may also be a fleece. Combinations are also conceivable.

Figure 1:
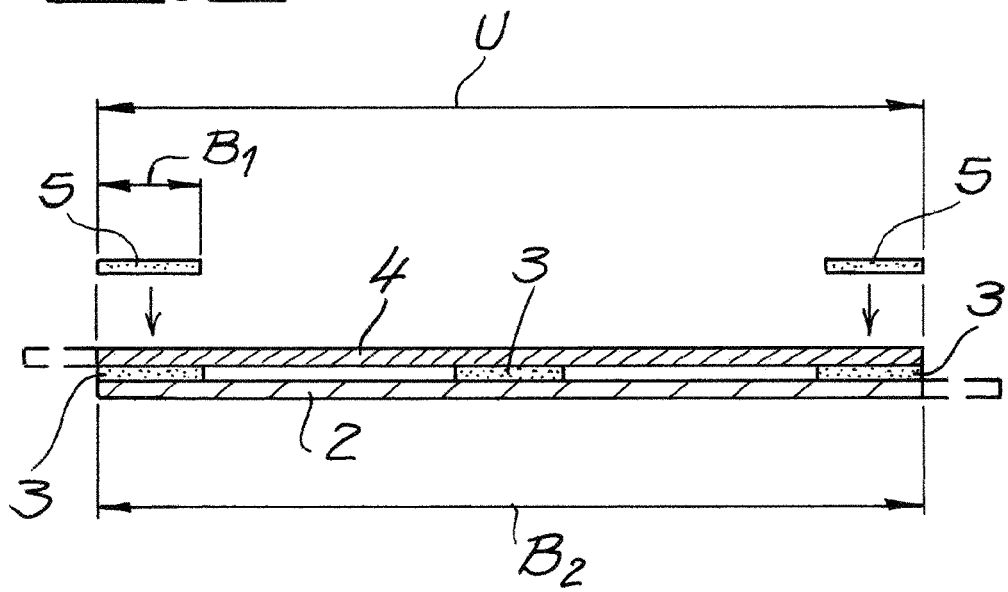
FIG. 1 is a schematic view of a sheath made according to the inventive method.

The first adhesive coating 3 is here and according to the invention composed of a plurality of spaced adhesive substrips 3, as can be seen in FIG. 1. To this end, the individual adhesive substrips 3 are applied by nozzles to the substrate strip 2 is elongated longitudinally and is altogether represented in a cross-section in FIG. 1 as was already described in the introduction. The application weight of the adhesive coating 3 may be within a range of 20 g/m$^2$ to 200 g/m$^2$. The adhesive coating 3 or the individual adhesive substrips 3 are those that are normally applied onto the substrate strip 2 on the basis of a UV-curable acrylate hot-melt adhesive. This only applies as an example and is of course not compulsory.

The adhesive tape 2, 3 of the substrate strip 2 and the first adhesive coating 3 realized in this manner is combined with an adhesive-free band 4 to form a laminate 2, 3, 4. The design of the adhesive-free band 4 means that it is not provided with an adhesive layer on either of its two faces before it has been used to form the laminate 2, 3, 4 with the adhesive tape 2, 3. Moreover, the design of the adhesive-free band 4 expresses that at this point, no adhesive coating is provided; the band 4, however, may be, for example, equipped with a plastic coating or otherwise.

The band 4 advantageously is, like the substrate strip 2, a textile band 4, although basically a foil or a non-textile material may be employed for making the band 4. Advantageously, the band 4, however, is a textile band 4. Here, as in case of the substrate strip 2, a fabric, and in particular a polyester fabric, has proved to be particularly advantageous.

Indeed, one may proceed, for example, in such a way that both the substrate strip 2 and the band 4 are made of a polyester fabric each having the same structure. This is of course understood only as advantageous and by way of example. In any case, the adhesive tape 2, 3 and the band 4 are combined to form the already mentioned laminate 2, 3, 4. This is done such that the substrate strip 2 of the adhesive tape 2, 3 and the band 4 overlap at least largely and define a region of overlap indicated in FIG. 1. Compared to this region of overlap U, which in each case occupies more than half the width of the substrate strip 2 and of the band 4, both the substrate strip 2 and the band 4 may project laterally and have a respective lateral projection shown by a broken line in FIG. 1. Normally, however, such a projection is not provided. In this case, the substrate strip 2 of the adhesive tape 2, 3 and the band 4 have essentially the same width and are combined, with their respective longitudinal edges lying one upon the other, in a common longitudinal extension by the first adhesive coating 3 to together form the laminate 2, 3, 4.

At the overlap U, the first adhesive coating 3 is provided between the substrate strip 2 and the band 4. The first adhesive coating 3 at the overlap U between the substrate strip 2 and the band 4 is composed of the already discussed plurality of spaced adhesive substrips 3.

Here, the design is such that the adhesive substrips 3 occupy the complete interstice between the substrate strip 2 and the band 4, seen in the cross-section. Thereby, any mechanical loads attacking the substrate strip 2 or the band 4 are absorbed by the laminate 2, 3, 4 as a whole. Moreover, this results in the increase of the abrasion resistance of the band material realized in this manner already described in the introduction.

With reference to the method sequence represented in FIG. 1, one can see that after the manufacture of the laminate 2, 3, 4, in addition, one further, second adhesive coating 5 is applied onto the band 4 on the outer face thereof turned away from the adhesive tape 2, 3. The second adhesive coating 5 is, like the first adhesive coating 3, also formed as at least one adhesive substrip 5. One can indeed see that the second adhesive coating 5 is composed of two adhesive substrips 5 each applied at a respective longitudinal edge of the band on the free outer face.

The two adhesive substrips 5 of the second adhesive coating 5 are each applied onto the band 4 with equal widths. The adhesive substrips 3 of the first adhesive coating 3, too, each have the same widths. Moreover, the adhesive substrips 3 of the first adhesive coating 3 are applied to the substrate strip 2 each at equal spacings, or equispaced.

All the adhesive substrips 3, 5 are altogether provided with a width $B_1$ that is identical here. This way, for the manufacture of the respective adhesive substrip 3, 5, one may use a nozzle having an identical design to apply the hot-melt adhesive. This is, of course, only an example.

In any case, the design is such that all the adhesive substrips 3, 5 have a width $B_1$ dimensioned within a range of 5 to 30% if a width $B_2$ of the region of overlap U. Particularly preferred, the respective width $B_1$ of all adhesive substrips 3, 5 is within a range of 10% to 25% of the width $B_2$ of the region of overlap U.

With reference to FIG. 2 and the sectional view therein, it now becomes clear how the longitudinal sheath or longitudinal casing realized in this way is folded around the elongated object 1 and forms the desired wrap. Indeed, to this end, the sheath or the special band material is first of all fixed by one of the adhesive substrips 5 of the second adhesive coating 5 to the respective elongated object 1. Subsequently, the sheath according to the embodiment is folded counterclockwise around the elongated object 1. In this manner, the second adhesive substrip 5 will come, at the opposite longitudinal edge of the band 4, into the region of the substrate strip 2 of the adhesive substrip 2 and may be fixed at a back of the substrate strip 2, opposite the first adhesive layer 3. Thereby, the longitudinal sheath or wrap is altogether wound around the elongated object 1 as a longitudinal sheath and in this manner forms a wrap. Here, it is understood that in the described example, the width $B_2$ of the region of overlap U, and consequently of the band material, is altogether dimensioned such that the complete elongated object 1 is encased and wrapped during the folding process.

The invention claimed is:

1. A method of making a wrapping sheath for an elongated object, the method comprising the steps of:
    combining an adhesive tape comprised of a substrate strip and a first adhesive coating at least partially covering the substrate strip with an adhesive-free band to form a laminate;
    overlapping the substrate strip and the band at least largely such that, at the overlap, the first adhesive coating is between the substrate strip and the band,
    forming the first adhesive coating at the overlap between the substrate strip and the band of a plurality of spaced adhesive substrips, and
    applying a second adhesive coating to the band on its outer face turned away from the adhesive tape.

2. The method according to claim 1, further comprising the step of:
    dimensioning the adhesive substrips of the first adhesive coating to have the same width.

3. The method according to claim 1, further comprising the step of:
    applying the adhesive substrips of the first adhesive coating to the substrate strip spaced apart equidistantly.

4. The method according to claim 1, wherein the second adhesive coating is at least one adhesive substrip.

5. The method according to claim 1, further comprising the step of:
    forming the second adhesive coating of adhesive substrips each applied to the band at a respective one of its two longitudinal edges.

6. The method according to claim 5, wherein the adhesive substrips of the second adhesive coating are each applied onto the band with equal widths.

7. The method according to claim 1, further comprising the steps of:
   fixing the sheath in the longitudinal direction to the elongated object with the second adhesive coating and then
   overlapping the longitudinal edges of the laminate.

8. A method of making a sheath for an elongated object, the method comprising the steps of:
   combining an adhesive tape comprised of a substrate strip and a first adhesive coating at least partially covering the substrate strip with an adhesive-free band to form a laminate;
   overlapping the substrate strip and the band at least largely such that, at the overlap, the first adhesive coating is between the substrate strip and the band, and
   forming the first adhesive coating at the overlap between the substrate strip and the band of a plurality of spaced adhesive substrips each having a width within a range of 5 to 30% of the overlap.

* * * * *